United States Patent [19]

Ikeda et al.

[11] Patent Number: 4,701,846
[45] Date of Patent: Oct. 20, 1987

[54] COMPUTER SYSTEM CAPABLE OF INTERRUPTION USING SPECIAL PROTECTION CODE FOR WRITE INTERRUPTION REGION OF MEMORY DEVICE

[75] Inventors: Kazuhiko Ikeda, Yokohama; Makoto Kawamura, Tokyo, both of Japan

[73] Assignee: Panafacom Limited, Kanagawa, Japan

[21] Appl. No.: 819,787

[22] Filed: Jan. 17, 1986

[30] Foreign Application Priority Data

Jan. 19, 1985 [JP] Japan .................. 60-008076

[51] Int. Cl.⁴ .............................. G06F 9/46
[52] U.S. Cl. .................................. 364/200
[58] Field of Search ... 364/200 MS File, 900 MS File

[56] References Cited
U.S. PATENT DOCUMENTS 4,432,050  2/1984  Harris et al. .................. 364/200

Primary Examiner—Raulfe B. Zache
Attorney, Agent, or Firm—Armstrong, Nikaido, Marmelstein & Kubovcik

[57] ABSTRACT

A computer system capable of interruption using a special protection code for a write interruption region of a main memory, including a subsidiary memory connected with a central processor unit and the main memory. The subsidiary memory delivers a translated real address code and protection codes including ordinary protection codes and the special protection code. Checking of the special protection code in the special protection code check number is carried out when the special protection code from the subsidiary memory is present and an access instruction from the central processor unit is a write instruction. Thereby, writing into a region beyond a stack region in the main memory is possible and the information of execution of the write interruption to the region beyond the stack region in the main memory is transmitted to the central processor unit.

2 Claims, 6 Drawing Figures

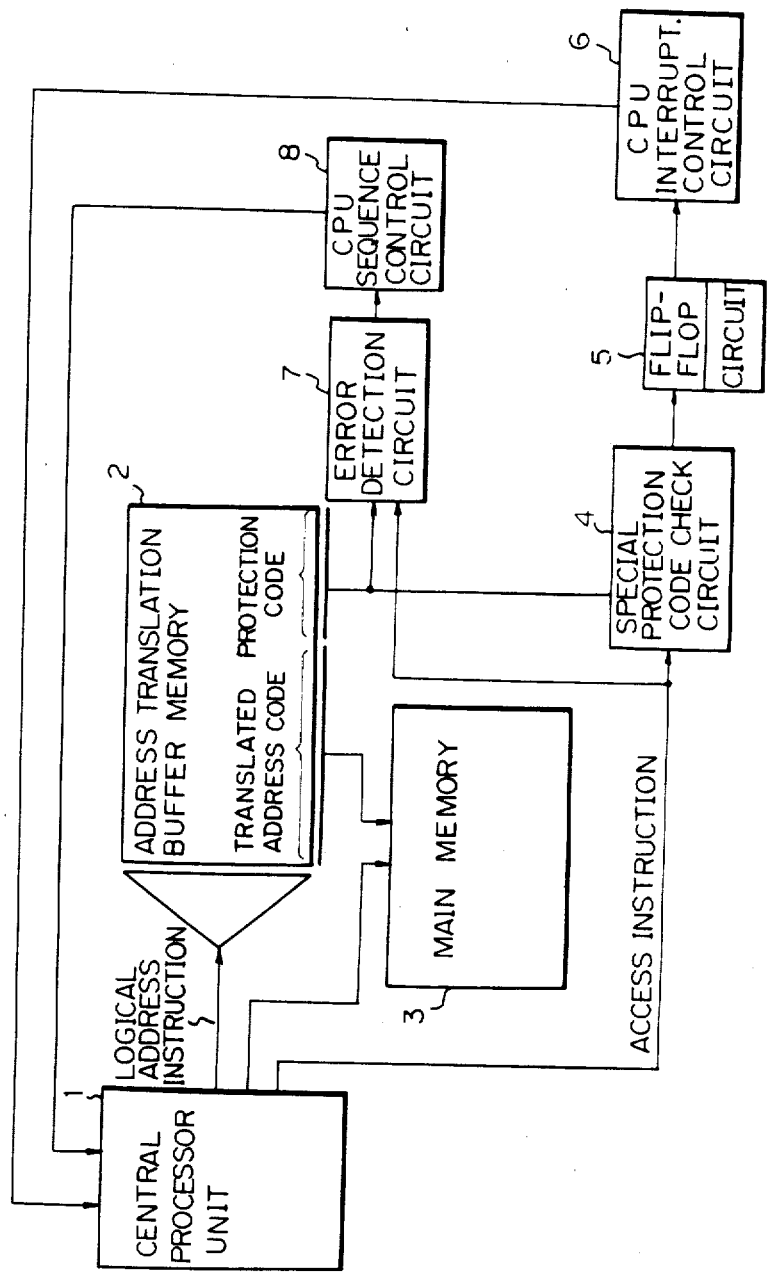

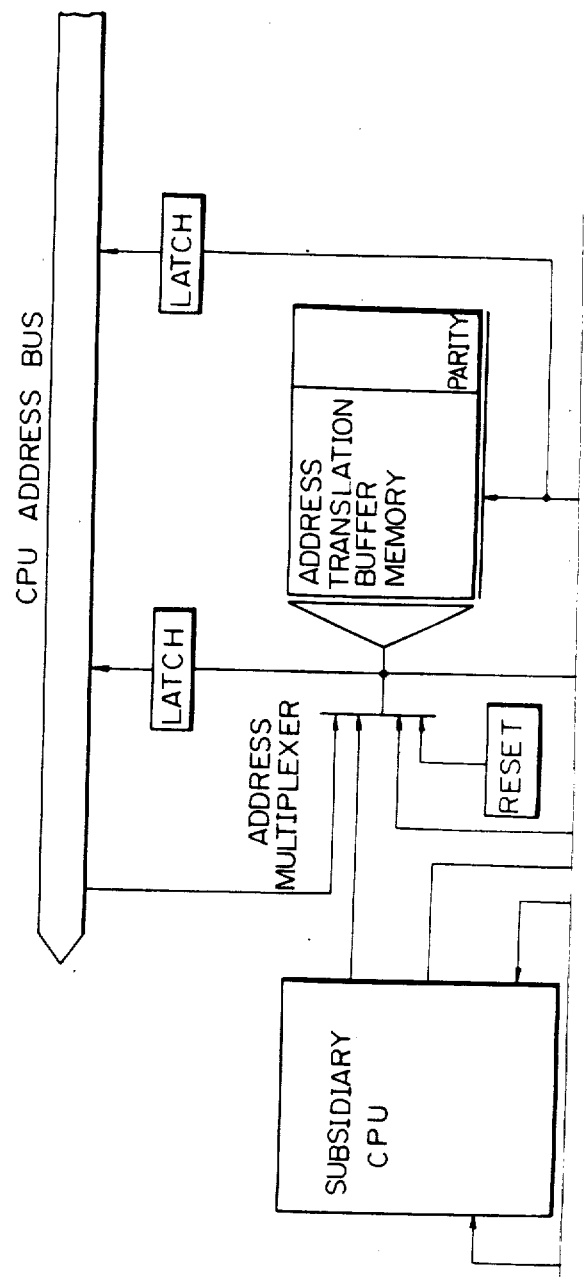

COMPUTER SYSTEM CAPABLE OF INTERRUPTION USING SPECIAL PROTECTION CODE FOR WRITE INTERRUPTION REGION OF MEMORY DEVICE

BACKGROUND OF THE INVENTION

1. Field of the Invention

The present invention relates to a computer system capable of interruption using a special protection code for the write interruption region of a memory device. The system according to the present invention is applicable to, for example, a central processor unit (CPU) for a microcomputer or minicomputer having a stack function.

2. Description of the Related Art

In general, a subsidiary memory device is used as an address translation buffer memory for a CPU and a main memory in a microcomputer or minicomputer having a stack function. The address translation buffer memory receives a logical address from the CPU and delivers a translated real address and a protection code. The translated real address is supplied to the main memory.

An error detection circuit receives the protection code from the address translation buffer memory and an access instruction code from the CPU to carry out error detection. When an error is detected by the error detection circuit, the information of the error is transmitted to the CPU and the devices to be accessed to prevent the access in question from being executed.

The stack function of the system is related to the stack region in the main memory and the stack pointer controlled by the instruction of the CPU. The scope of the stack region is essentially limited. If the address indicated by the stack pointer proceeds through the entire stack region and further proceeds excessively to the region for the usual program and usual data, that is, if an overflow of the stack operation occurs, there is a problem that the stack data may be written into the region for the usual program and usual data and thus destroy the stored program and data.

Due to this, in the prior art, the system is constructed to prohibit writing operations to the region beyond the stack region.

Accordingly, there has been the disadvantage of suspension of the operation of the CPU, preventing the desired continuation of the system operation, when the stack pointer invades the region beyond the stack region.

SUMMARY OF THE INVENTION

It is an object of the present invention to provide an improved computer system capable of interruption, in which a special protection code for the write interruption region of the memory device is used, so that invasion of the stack pointer to the region beyond the stack region is informed to the CPU and consequently the undesirable stoppage of the operation of the system is prevented.

According to the fundamental aspect of the present invention, there is provided a computer system including a central processor unit; a main memory device connected with the central processor unit; a subsidiary memory device connected with the central processor unit and the main memory device for delivering a translated real address code and protection codes including ordinary protection codes and a special protection code; an error detection unit responsive to the ordinary protection codes from the subsidiary memory device and an access instruction from the central processor unit for checking the ordinary protection codes; and a special protection code check unit responsive to the special protection code from the subsidiary memory device and an access instruction from the central processor unit for checking the special protection code. Error detection in the error detection unit is carried out when the ordinary protection codes from the subsidiary memory device do not coincide with the access instruction from the central processor unit. Checking of the special protection code in the special protection code check unit is carried out when the special protection code from the subsidiary memory device is present and the access instruction from the central processor unit is a write instruction. Accordingly, writing into a region beyond the stack region in the main memory device is possible and the information of execution of the write operation to the region beyond the stack region in the main memory device is transmitted to the central processor unit.

BRIEF DESCRIPTION OF THE DRAWINGS

In the drawings.

FIG. 2 is a schematic block diagram of a computer system according to an embodiment of the present invention; and FIGS. 3, 3A, 3B, and 3C show an arrangement of a portion of a computer system in which the system of FIG. 2 can be included.

DESCRIPTION OF THE PREFERRED EMBODIMENTS

Figure 1:
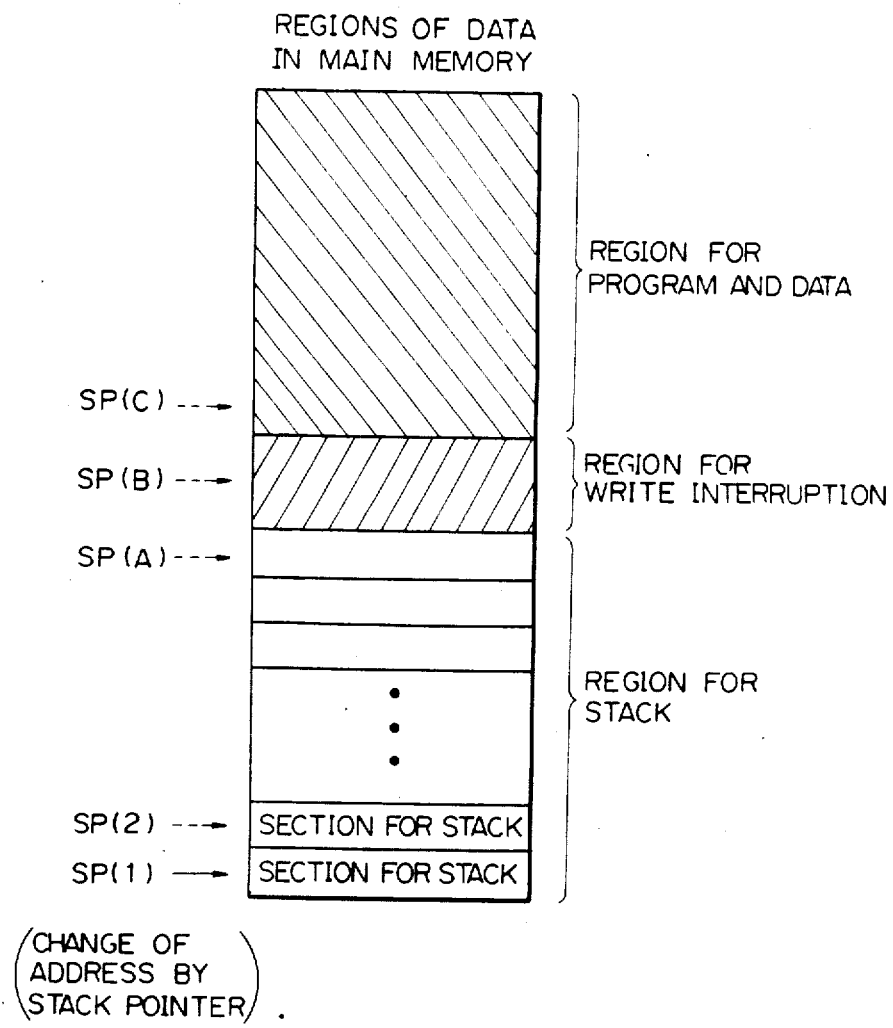
FIG. 1 shows the arrangement of regions in the main memory device used in a computer system according to an embodiment of the present invention.

The arrangement of data regions in a main memory device used in a computer system according to an embodiment of the present invention is shown in FIG. 1. The data region consists of the region for the usual program and usual data in the upper part in FIG. 1, the region for write interruption in the middle part, and the stack region in the lower part.

The stack region consists of a sequence of stack sections, corresponding from the bottom to the top to the stack pointer SP(1) to the stack pointer SP(A), respectively. In the stack region, data concerning interruption, data concerning error, and the like are stored in the form of a stack. The position of the stack section in question is indicated by the stack pointer SP instructed by the CPU.

The stack sections in the stack region are successively occupied from the bottom to the top according to the change of address by the stack pointer from SP(1) to SP(A). After all of the stack sections in the stack region are occupied, the stack pointer changes its address to SP(B), corresponding to the region for write interruption, to instruct storage of data into the region for write interruption. After the region for write interruption is occupied, the stack pointer changes its address to SP(C), corresponding to the bottom section of the region for the program and data, to instruct storage of data into the bottom section of the region for the program and data.

The address of the stack pointer SP can be changed from the bottom address SP(1) up as the write operations proceed from the bottom toward the top. Also, the address of the stack pointer SP can be changed from the top address SP(A) down as the read operations proceed from the top toward the bottom.

In the prior art, the system is constructed to prohibit a write operation to the region for write interruption. For this purpose, a protection code for disabling writing is provided in the address translation buffer memory for the region for write interruption. Even if it is attempted to write data into the region for write interruption, data indicating an error is transmitted from an error detection unit to the CPU and the main memory. As the CPU is constructed to store the data concerning errors into the stack when an error occurs, the CPU tries to store the data concerning the error into the stack but again an error is detected. Consequently, the operation of the system is forced to stop without being noticed the reason of the stoppage.

The system according to the present invention is directed to eliminate these disadvantages in the prior art.

A schematic block diagram of a computer system capable of interruption using a special protection code for the write interruption region of a memory device according to an embodiment of the present invention is given in FIG. 2.

The system of FIG. 2 includes a CPU 1, a main memory 3, a subsidiary memory device in the form of an address translation buffer memory 2, a special protection code check circuit 4, a flip-flop circuit 5, a CPU interruption control circuit 6, an error detection circuit 7, and a CPU sequence control circuit 8.

The address translation from a logical address to a translated real address is carried out in the address translation buffer memory 2 as a subsidiary memory device.

There are a number of protection codes delivered from the protection code output portion of the address translation buffer memory 2. As ordinary protection codes, for example, "0001" for write prohibition and "0010" for read prohibition are provided. As the special protection code according to the present invention, for example, the code "1011" is set.

The protection code delivered from the protection code output portion of the address translation buffer memory 2 is supplied both to the error detection circuit 7 and the special protection code check circuit 4.

In the error detection circuit 7, discrimination of the protection code from the buffer memory 2 and comparison with the access instruction code from the CPU 1 is carried out. When the protection code from the buffer memory 2 is discriminated as an ordinary protection code and this discriminated ordinary protection code does not coincide with the access instruction code, the error detection circuit 7 delivers the error detection signal, which is supplied to the CPU sequence control circuit 8. The CPU sequence control circuit 8 supplies the CPU 1 with the result of the error detection as the bus error signal.

In the special protection code check circuit 4, discrimination of the protection code from the buffer memory 2 and comparison with the access instruction code from the CPU 1 is carried out. When the protection code from the buffer memory 2 is discriminated as the special protection code and the access instruction code is the write instruction code, the special protection code check circuit 4 delivers the check output signal, which is supplied to the input terminal of the flip-flop circuit 5, to set this flip-flop circuit. In this case, no error detection signal is delivered from the error detection circuit 7 so that the access operation to the region for write interruption (FIG. 1) of the memory is executed without any prohibitions.

After the access operation to the region for write interruption (FIG. 1) is completed, the interruption indication signal is transmitted from the CPU interruption indication circuit 6, which receives the output of the flip-flop circuit 5, to the CPU 1. Hence, the fact that the overflow of the stack has been occurred is acknowledged by the CPU through the interruption process triggered by the interruption indication circuit 6. For this interruption processing, the region for write interruption in FIG. 1 desired to include at least two sections for stacking data, because when interruption occurs, the status in the CPU must be stacked into the stack. Accordingly, the undesirable stoppage of the operation of the system as in the prior art is prevented.

Figure 3B:
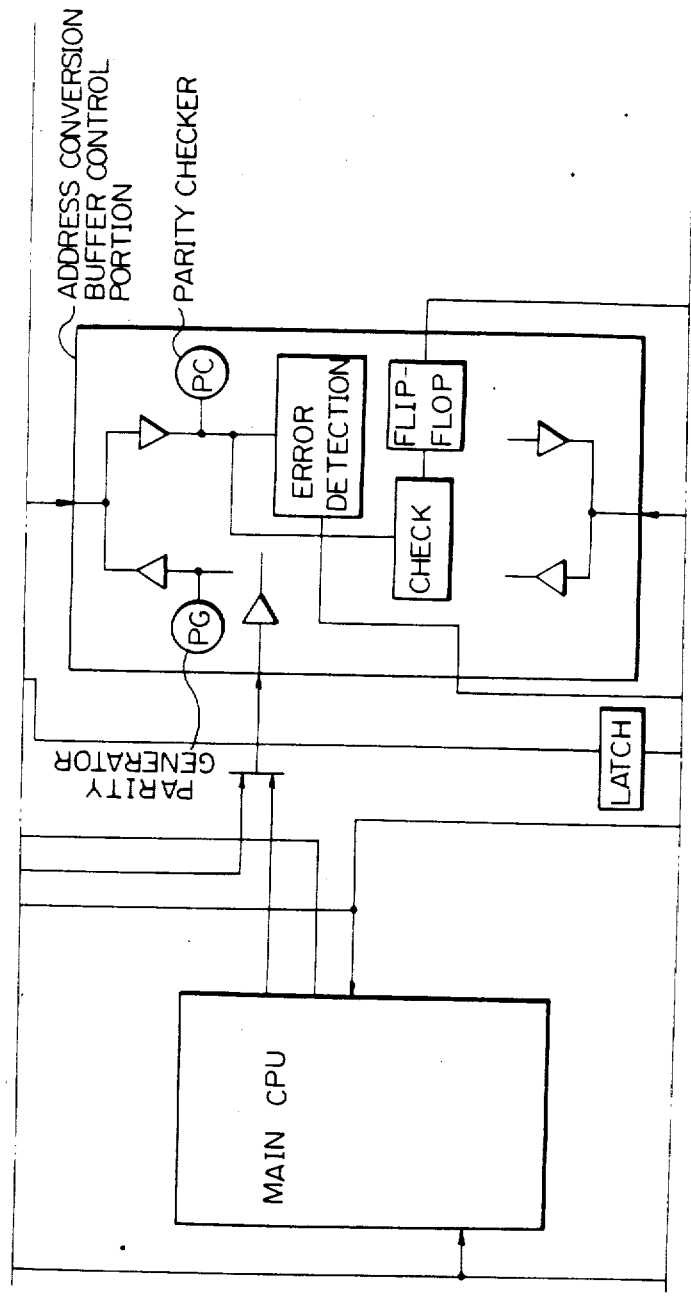
Figure 3C:
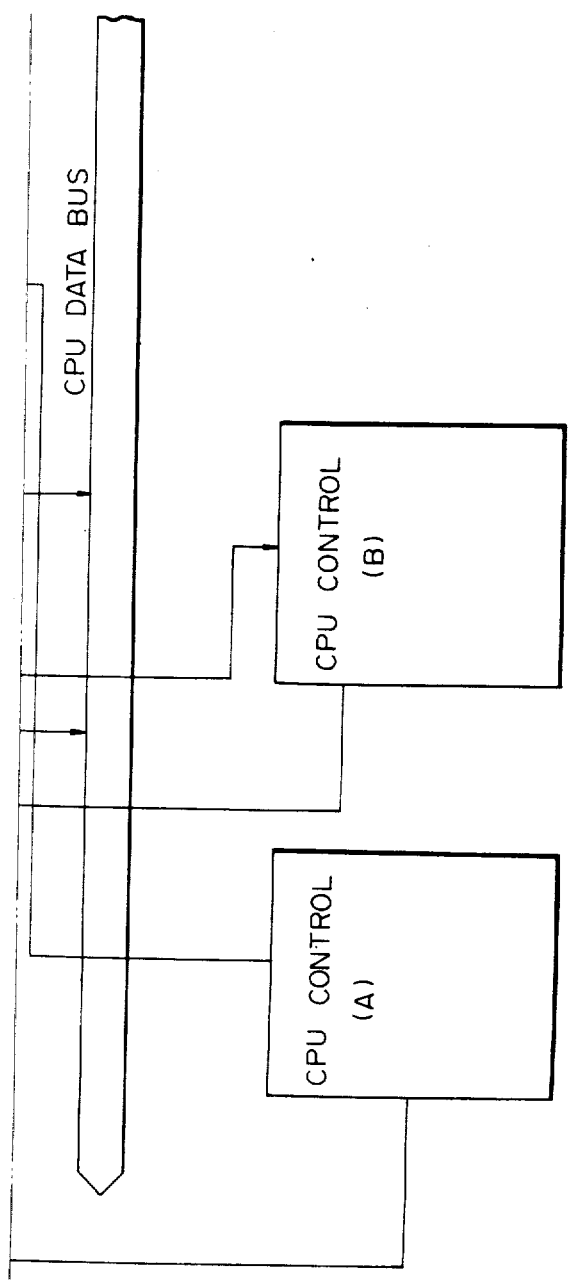

An example of the arrangement of a portion of a computer system in which the system of FIG. 2 can be included is shown in FIG. 3. The arrangement of FIG. 3 includes a main CPU, a subsidiary CPU, a CPU address bus, a CPU data bus, an address multiplexer gate, an address translation buffer memory, an address conversion buffer control portion, a CPU control (A) portion, and a CPU control (B) portion. The address conversion buffer control portion includes a parity generator, a parity checker, an error detection circuit, a check circuit, and a flip-flop circuit.

The error detection circuit corresponds to the error detection circuit 7 of FIG. 2. The check circuit and the flip-flop circuit correspond to the special protection code check circuit 4 and the flip-flop circuit 5 of FIG. 2. The passage from the error detection circuit via the CPU control (B) portion to the main CPU and the subsidiary CPU corresponds to the passage from the error detection circuit 7 via the CPU sequence control circuit 8 to the CPU 1 of FIG. 2. The passage from the check circuit via the flip-flop circuit and the CPU control (A) portion to the main CPU and the subsidiary CPU corresponds to the passage from the special protection code check circuit 4 via the flip-flop circuit 5 and the CPU interruption indication circuit 6 to the CPU of FIG. 2.

The subsidiary CPU administrates and controls the address translation buffer memory. Namely, the address translation buffer memory contains only a part of address translation tables which are stored in the main memory. And when an address translation information desired by the main CPU is not found in the adderss translation buffer memory, the subsidiary CPU carries out the address translation using the tables in the main memory, and the translation result is written into the address translation buffer memory.

What is claimed is:
1. A computer system comprising:
a central processor unit;
a main memory having a stack region device connected to said central processor unit;
a subsidiary memory device connected to said central processor unit and said main memory device for delivering a translated real address and protection codes including ordinary protection codes and a special protection code;
an error detection means responsive to said ordinary protection codes from said subsidiary memory device and an access instruction from said central processor unit for checking said ordinary protection codes; and a special protection code check means responsive to said special protection code from said subsidiary memory device and an access instruction from said central processor unit for checking said special protection code;

error detection in said error detection means being carried out when said ordinary protection codes from said subsidiary memory device do not coincide with said access instruction from said central processor unit;

checking of said special protection code in said special protection code check means being carried out when said special protection code from said subsidiary memory device is present and said access instruction from said central processor unit is a write instruction, whereby writing into a region beyond said stack region in said main memory device is possible and the information of execution of the write operation to said region beyond said stack region in said main memory device is transmitted to said central processor unit.

2. A computer system comprising:

a central processor unit having a stack pointer function;

a main memory device connected to said central processor unit and having a region for program and data, a region for write interruption, and a stack region;

a subsidiary memory device connected to said central processor unit and said main memory device for delivering a translated real address and protection codes including ordinary protection codes and a special protection code for representing an overflow beyond said stack region in said main memory device;

an error detection means responsive to said ordinary protection codes from said subsidiary memory device and an access instruction from said central processor unit for checking said ordinary protection codes; and a special protection code check means responsive to said special protection code from said subsidiary memory device and an access instruction from said central processor unit for checking said special protection code;

error detection in said error detection means being carried out when said ordinary protection codes from said subsidiary memory device do not coincide with said access instruction from said central processor unit;

checking of said special protection code in said special protection code checking means being carried out when said special protection code from said subsidiary memory device is present and said access instruction from said central processor unit is a write instruction, whereby writing into a region beyond said stack region in said main memory device is possible and the information of the execution of the write operation to said region beyond said stack region in said main memory device is transmitted to said central processor unit.

* * * * *

UNITED STATES PATENT AND TRADEMARK OFFICE
CERTIFICATE OF CORRECTION

PATENT NO. : 4,701,846

DATED : October 20, 1987

INVENTOR(S) : Kazuhiko IKEDA et al

It is certified that error appears in the above-identified patent and that said Letters Patent is hereby corrected as shown below:

Column 4, Claim 1, line 59, "memory having a stack region device" should read --memory device having a stack region--.

Signed and Sealed this

Seventh Day of June, 1988

Attest:

DONALD J. QUIGG

*Attesting Officer*    Commissioner of Patents and Trademarks